(12) United States Patent
Fukuta et al.

(10) Patent No.: US 8,432,715 B2
(45) Date of Patent: Apr. 30, 2013

(54) POWER CONVERSION CONTROL APPARATUS FOR POWER CONVERSION CIRCUIT INCLUDING HIGH-SIDE AND LOW-SIDE SWITCHING ELEMENTS AND POWER STORAGE DEVICE

(75) Inventors: Junichi Fukuta, Anjo (JP); Tsuneo Maebara, Nagoya (JP); Yusuke Shindo, Nagoya (JP)

(73) Assignee: Denso Corporation, Kariya (JP)

( * ) Notice: Subject to any disclaimer, the term of this patent is extended or adjusted under 35 U.S.C. 154(b) by 123 days.

(21) Appl. No.: 12/899,777

(22) Filed: Oct. 7, 2010

(65) Prior Publication Data

US 2011/0080149 A1 Apr. 7, 2011

(30) Foreign Application Priority Data

Oct. 7, 2009 (JP) ................................. 2009-233534

(51) Int. Cl.
*H02M 3/24* (2006.01)
*H02M 7/5387* (2007.01)

(52) U.S. Cl.
USPC ............................................ 363/98; 363/132

(58) Field of Classification Search .............. 363/34–38, 363/95, 98, 132, 16–17, 97, 123, 131
See application file for complete search history.

(56) References Cited

U.S. PATENT DOCUMENTS

| | | | |
|---|---|---|---|
| 4,420,743 A * | 12/1983 | Upadhyayula | 341/136 |
| 5,687,049 A * | 11/1997 | Mangtani | 361/18 |
| 8,125,194 B2 * | 2/2012 | Nethken | 320/137 |
| 2003/0137858 A1 * | 7/2003 | Tsuji et al. | 363/132 |
| 2004/0008530 A1 * | 1/2004 | Kitahata et al. | 363/131 |
| 2004/0196678 A1 * | 10/2004 | Yoshimura et al. | 363/79 |
| 2004/0223347 A1 * | 11/2004 | Kobayashi et al. | 363/37 |
| 2007/0159856 A1 * | 7/2007 | Yang | 363/21.12 |
| 2008/0079503 A1 * | 4/2008 | Byeon et al. | 331/16 |
| 2009/0135636 A1 * | 5/2009 | Kuzumaki et al. | 363/132 |
| 2009/0251103 A1 * | 10/2009 | Yamamoto et al. | 320/133 |
| 2010/0133912 A1 * | 6/2010 | King et al. | 307/82 |
| 2011/0083123 A1 | 4/2011 | Lou et al. | |

FOREIGN PATENT DOCUMENTS

| | | |
|---|---|---|
| JP | 9-201065 | 7/1997 |
| JP | 3289567 | 3/2002 |
| JP | 2003-348856 | 12/2003 |
| JP | P2008-061300 A | 3/2008 |
| JP | P2008-228447 A | 9/2008 |
| JP | 2009-232620 | 10/2009 |
| JP | 2011-83123 | 4/2011 |

OTHER PUBLICATIONS

Office Action (2 pgs.) dated Feb. 5, 2013 issued in corresponding Japanese Application No. 2011-210915 with an at least partial English-language translation thereof (2 pgs.).

* cited by examiner

*Primary Examiner* — Adolf Berhane
*Assistant Examiner* — Jeffrey Gblende
(74) *Attorney, Agent, or Firm* — Nixon & Vanderhye P.C.

(57) ABSTRACT

The power conversion control apparatus is for controlling a power conversion circuit in which a plurality of pairs each including a high-side switching element and a low-side switching element connected in series to each other are connected in parallel to a capacitor, and an external battery is connected to the capacitor through a relay. To discharge the capacitor, the power conversion control apparatus turns on both the high-side and low-side switching elements of at least one of the pairs to make a short circuit between both electrodes of the capacitor on condition that the relay is open.

23 Claims, 13 Drawing Sheets

(a) MAIN RELAY 14
(b) U-Swp
(c) U-Swn
(d) CAPACITOR 16

Vge — TO DRIVE MG
Vg0
— TO DISCHARGE CAPACITOR

Ic, Ith, Vce, Vge, Vg0, LARGE, SMALL

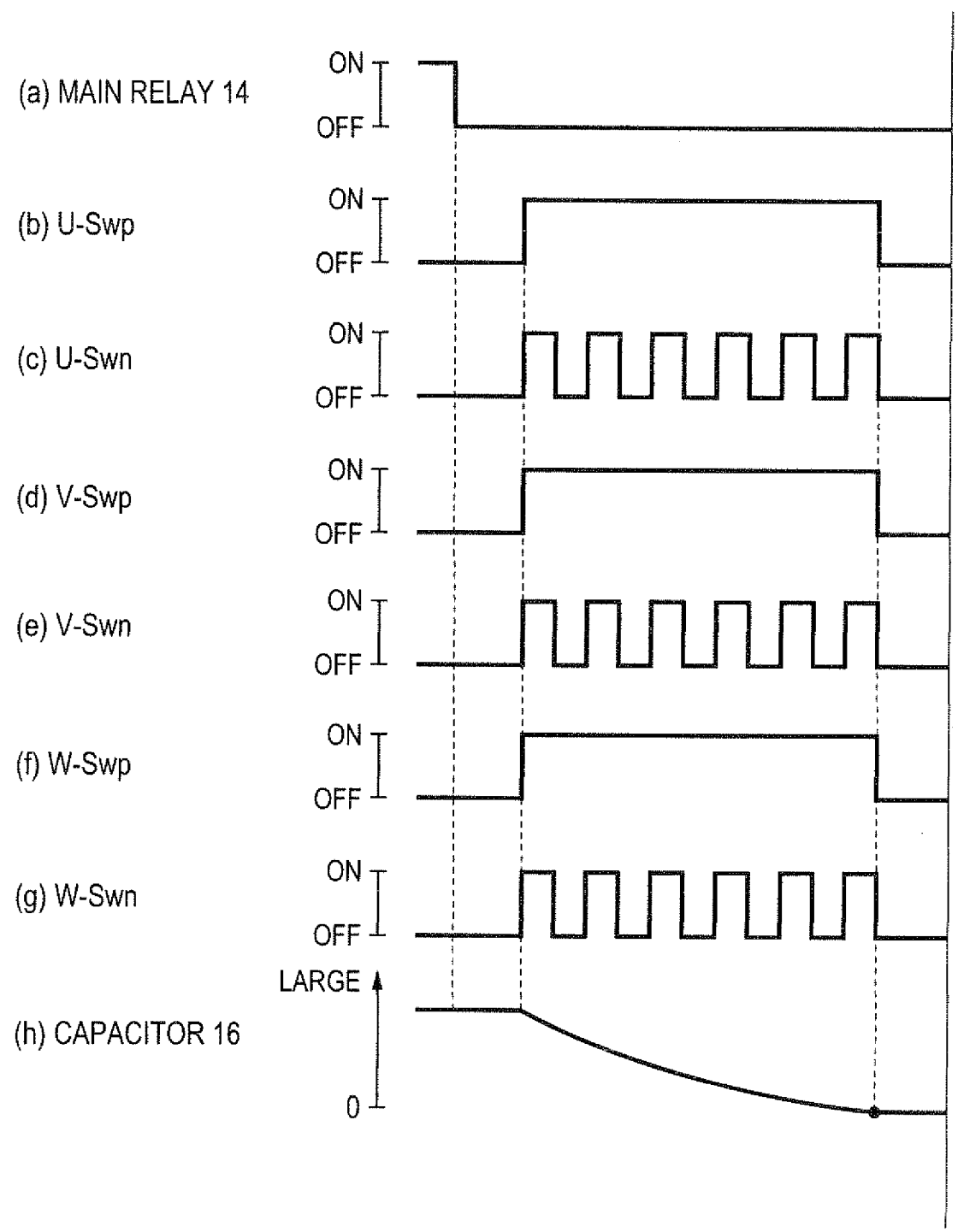

POWER CONVERSION CONTROL APPARATUS FOR POWER CONVERSION CIRCUIT INCLUDING HIGH-SIDE AND LOW-SIDE SWITCHING ELEMENTS AND POWER STORAGE DEVICE

This application claims priority to Japanese Patent Application No. 2009-233534 filed on Oct. 7, 2009, the entire contents of which are hereby incorporated by reference.

BACKGROUND OF THE INVENTION

1. Field of the Invention

The present invention relates to a power conversion control apparatus for a power conversion circuit in which a plurality of pairs each including a high-side switching element and a low-side switching element connected in series to each other are connected in parallel to a power storage means.

2. Description of Related Art

As described, for example, in Japanese Patent No. 3289567, some of such power conversion control apparatuses are configured to perform discharge control to discharge a storage means (capacitor, for example) connected between a pair of input terminals of an inverter whose output terminals are connected to a motor. The control apparatus described in this patent document performs the discharge control to discharge the charge in a capacitor as the storage means to ensure safety in maintenance work, for example, by manipulating the inverter such that the torque of the motor becomes substantially zero.

Japanese Patent Applications Laid-Open No. H9-201065 and No. 2003-348856 also describe power conversion control apparatuses of the above type.

However, the conventional power conversion control apparatus described above has a problem in that the process of discharging the capacitor is complicated and intricate because the inverter has to be manipulated such that the motor does not generate torque.

SUMMARY OF THE INVENTION

The present invention provides a power conversion control apparatus for a power conversion circuit including at least one series connection of a high-side switching element and a low-side switching element, the series connection being parallel-connected between first and second electrodes of a power storage element, each of the high-side and low-side switching elements being a voltage-controlled type switching element having an input terminal, an output terminal and a conduction control terminal and being provided with an overcurrent protection circuit configured to turn off a corresponding one of the high-side and low-side switching elements when a current flowing through the series connection exceeds a threshold current, the power conversion control apparatus comprising:

a power conversion control section to control conduction of each of the high-side and the low-side switching elements to enable the power conversion circuit to perform power conversion operation; and a discharge control section to perform a discharge process to discharge the power storage element in order to reduce a charged voltage of the power storage element below a predetermined voltage, wherein the discharge control section is configured to repeatedly turn on and off at least one of the high-side and low-side switching elements in order that a short-circuit state in which the first and second electrodes of the power storage element are short circuited to each other is generated multiple times during a period during which the charged voltage is below the predetermined voltage, and a voltage applied to the conduction control terminal of the at least one of the high-side and low-side switching elements is set lower than a threshold voltage, a saturation current of the at least one of the high-side and low-side switching elements when applied with the threshold voltage at the conduction control terminals thereof does not exceed the threshold current.

According to the present invention, there is provided a power conversion control apparatus for a power conversion circuit having the structure in which a plurality of series connections of a high-side switching element and a low-side switching element are parallel connected to a power storage element, which is capable of properly discharging the power storage element by performing a simple process.

Other advantages and features of the invention will become apparent from the following description including the drawings and claims.

BRIEF DESCRIPTION OF THE DRAWINGS

In the accompanying drawings:

FIG. 16 is a time chart explaining a discharge process performed in a modification of the power conversion circuit of the second embodiment of the invention.

PREFERRED EMBODIMENTS OF THE INVENTION

First Embodiment

Figure 1:
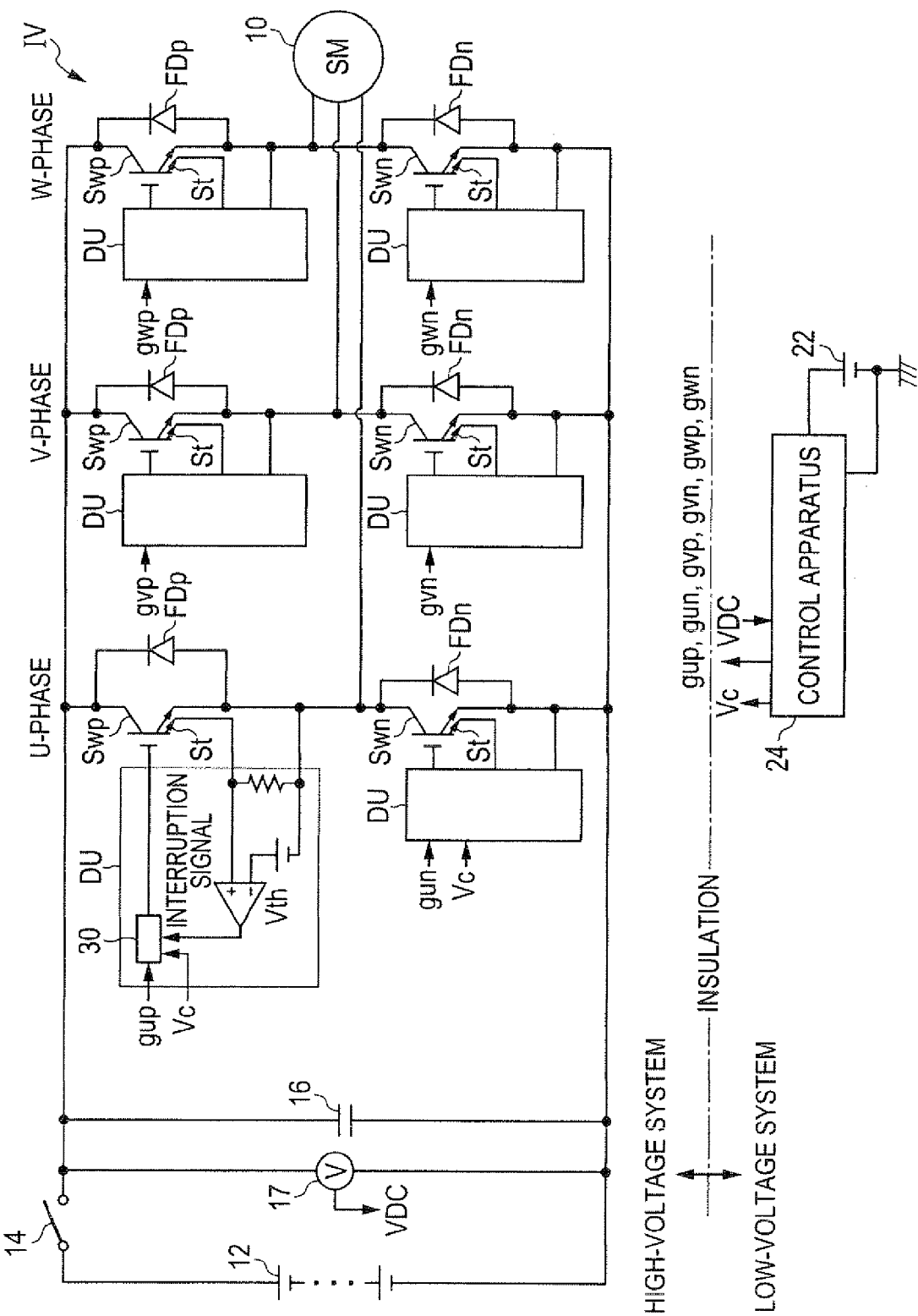
FIG. 1 is a diagram showing the structure of a power conversion circuit including a power conversion control apparatus according to a first embodiment of the invention.

FIG. 1 is a diagram showing the structure of a power conversion circuit for a hybrid vehicle including a power conversion control apparatus according to a first embodiment of the invention. As shown in FIG. 1, a motor-generator 10 as a vehicle main machine is connected to a high-voltage battery 12 and a capacitor 16 through an inverter IV and a main relay 14. The inverter IV is constituted of three parallel-connected pairs of series connections each including a high-side power switching element Swp and a low-side power switching element SWn. The connection node between the high-side power switching element Swp and the low-side power switching element Swn of each series connection is connected to a corresponding one of the respective phases of the motor-generator 10.

The input terminals (collector and emitter) of each of the high-side power switching elements Swp are respectively connected to the cathode and anode of a high-side freewheel diode FDp. The input terminals (collector and emitter) of each of the low-side power switching elements Swn are respectively connected to the cathode and anode of a low-side freewheel diode FDn. Each of the high-side power switching elements Swp and low-side power switching elements Swn is constituted of an IGBT (Insulated Gate Bipolar Transistor). Each of the high-side power switching elements Swp and the low-side power switching elements Swn is provided with a sense terminal. ST to output a small current having correlation with the current flowing between the output terminals (between the collector and emitter). A control apparatus 24, which is powered by a low-voltage battery 22, operates to manipulate the inverter IV in accordance with output signals from various sensors including a voltage sensor 17 for measuring the input voltage VDC of the inverter IV in order to control a controlled variable of the motor-generator 10. In more detail, the control apparatus 24 generates manipulation signals gup, gyp and gwp used to manipulate the high-side power switching elements Swp of the U-phase, V-phase and W-phase of the inverter IV, and manipulation signals gun, gvn and gwn used to manipulate the low-side power switching elements Swn of the U-phase, V-phase and W-phase of the inverter IV in accordance with the output signals of the various sensors (not shown). Each of the power switching elements Swp and the power switching elements Swn is connected to a drive unit DU at its conduction control terminal (gate) which receives the manipulation signal outputted from the control apparatus 24. In this embodiment, the high voltage system including the inverter IV and the low voltage system including the control apparatus 24 are electrically insulated from each other by insulating means such as photocouplers. The manipulation signals are transmitted from the low voltage system to the high voltage system through the insulation means.

In the following, the high-side power switching element Swp and the low-side power switching element Swn are collectively called the power switching element Sw, the high-side freewheel diode FDp and the low-side freewheel diode FDn are collectively called the freewheel diode FD, and the manipulation signals gup, gvp, gwp, gcp, gun, gvn, gwn and gcn are collectively called the manipulation signal g.

The drive unit DU has not only the function of turning on and off the power switching element Sw in accordance with the manipulation signal g, but also the function of forcibly turning off the power switching element Sw when the current flowing between the input terminal and the output terminal (between the collector and emitter) is detected to be excessively large. In more detail, the drive unit DU has the function of forcibly turning off the power switching element Sw when the current flowing between the input terminal and the output terminal thereof is determined to be larger than a threshold current Ith on the basis of the sense current outputted from the sense terminal St of the power switching element Sw. In this embodiment, this determination is made in accordance with the result of comparison between a voltage drop across a resistor through which the sense current flows and a threshold voltage Vth corresponding to the threshold current Ith.

The drive unit DU includes a variable voltage circuit 30 having a function of variably setting a voltage applied to the conduction control terminal (gate) of the power switching element Sw to turn on the power switching element Sw. This function can be implemented by the structure shown in FIG. 2A or FIG. 2B, for example.

Figure 2A:
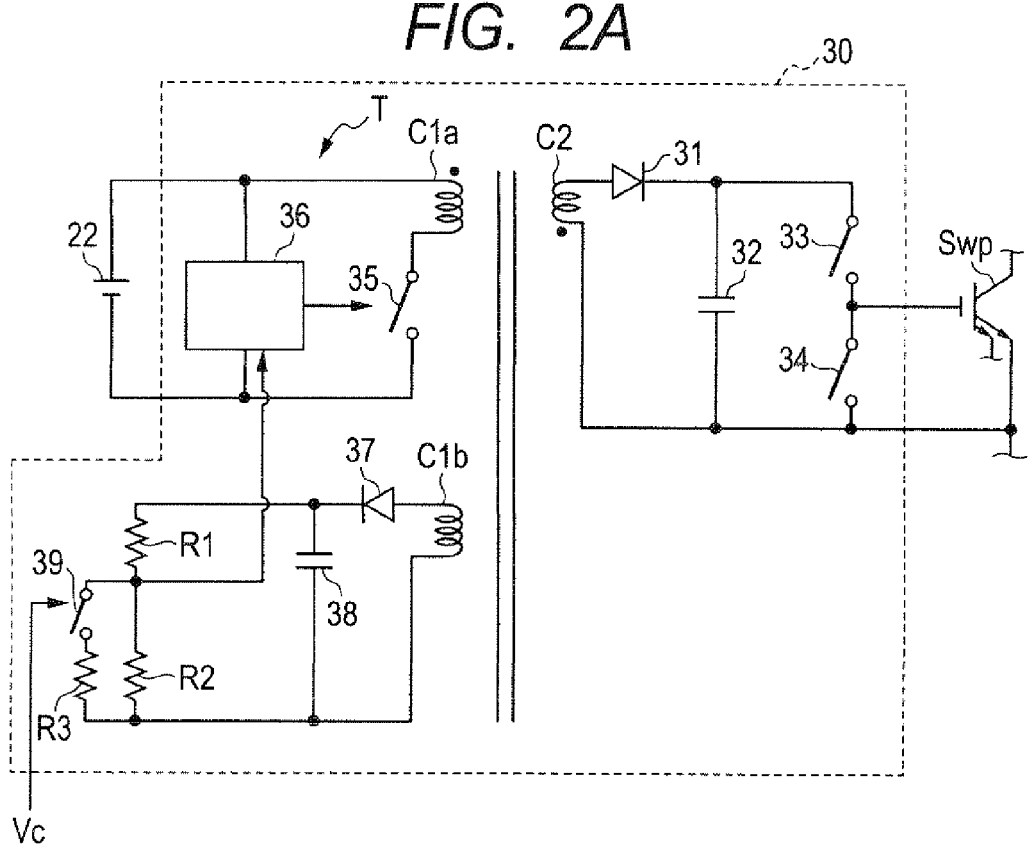
FIGS. 2A and 2B are diagrams showing the circuit structures of driver circuits included in the power conversion circuit.

FIG. 2A shows an example of the structure to enable variably setting the voltage applied to the gate by variably setting the output voltage of a transformer T included in the variable voltage circuit 30. This example includes, on the secondary side of the transformer T, a diode 31 to enable the transformer T to operate as a flyback converter, a capacitor 32 parallel-connected to the both ends of the secondary side of the transformer T, and a series connection of a charge switching element 33 and a discharge switching element 34 parallel-connected to the capacitor 32. A primary coil C1a of the transformer T is parallel-connected to the low-voltage battery 22. The loop circuit constituted of the primary coil C1a and the low-voltage battery 22 is opened and closed by a switching element 35 being turned on and off by a voltage control section 36.

The voltage control section 36 controls the output voltage of the transformer T by manipulating the ratio of the on period to the total on-off period (duty ratio) of the switching element 35. In this example, the output voltage of the transformer is measured so that the voltage control section 36 feedback-controls the output voltage of the transformer T. The output voltage of the transformer T is measured as follows.

A capacitor 38 is parallel connected to a primary coil C1b through a diode 37. The capacitor 38 is connected with a series connection of resistors R1 and R2. The resistors R1 and R2 are for dividing the voltage between both ends of the primary coil C1b (the voltage across the capacitor 38). The voltage at the connection node between the resistors R1 and R2 is a measured value of the output voltage of the transformer T. The voltages of the primary coil C1b and the secondary coil C2 have a relationship depending on the turn ratio between the primary coil C1b and secondary coil C2. Accordingly, the voltage across the secondary coil C2 can be measured indirectly by measuring the voltage across the primary coil C1b.

A switching element 39 and a resistor R3 are parallel-connected to the resistor R2. Accordingly, the voltage across the primary coil C1b is divided by the resistors R1 and R2 when the switching element 39 is off, while it is divided by the resistors R2, R3 and R1 when the switching element 39 is on. Accordingly, the divided voltage when the switching element 39 is on is lower than that when the switching element 39 is off. Therefore, the voltage recognized by the voltage control section 36 is lower when the switching element 39 is on than that when the switching element 39 is off. Hence, when the switching element 39 is on, the voltage control section 36 controls the output voltage of the transformer T at a larger value than when the switching element 39 is off. As explained above, turning on and off the switching element 39 enables variably setting a target voltage of the voltage control section 36. The switching element 39 is controlled by the control apparatus 24.

Figure 2B:
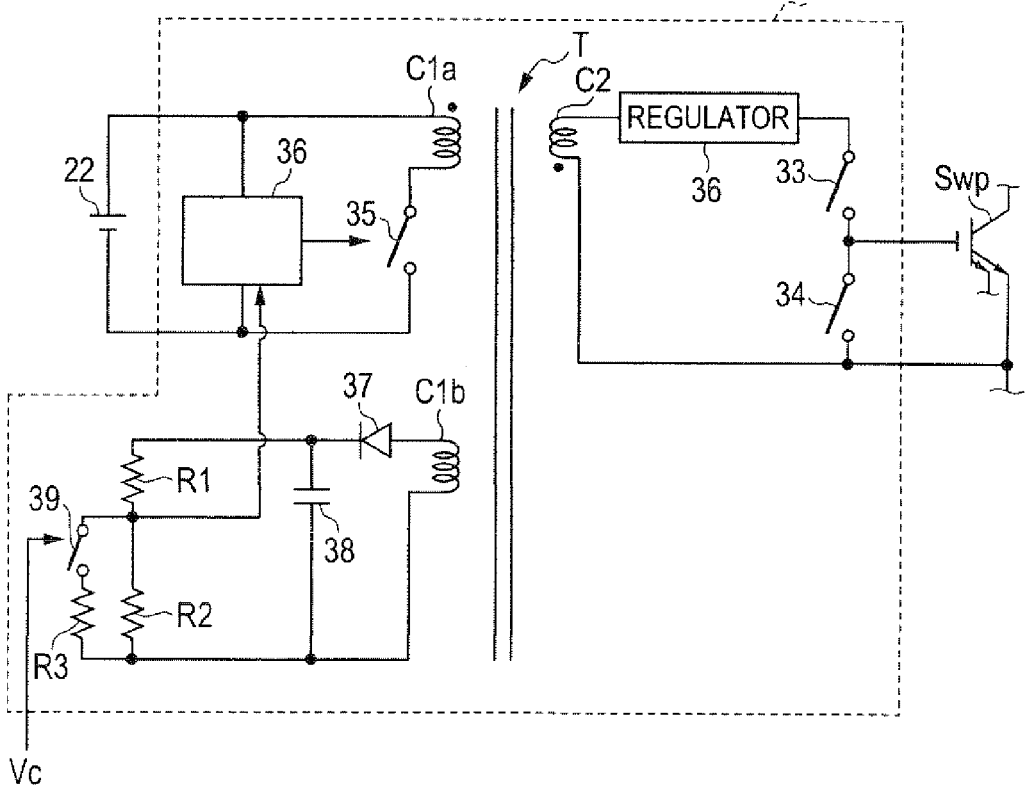

FIG. 2B shows an example of the structure in which the drive unit UD is provided with a regulator 36, and the voltage applied to the gate is finely and variably set by varying the output voltage of the regulator 36. The regulator 36 may be constituted of two regulator circuits each of which controls the output voltage at a fixed value. The regulator 36 may be configured to switch its output voltage in accordance with the output voltage of the transformer T.

Next, a process to discharge the capacitor 16 is explained. The capacitor 16, which serves as a power supply for the inverter IV, has an ability to suppress variation of the input voltage of the inverter IV to a small value even when the inverter IV is located distant from the high voltage battery 12. However, it is preferable to discharge the capacitor 16 under condition in which the vehicle is not permitted to run. Such condition occurs when the main relay 14 or the control apparatus 24 is off because the user of the vehicle does not intend to run the vehicle, for example. Further, such condition occurs when the control apparatus 24 forcibly turns off the main relay 14 due to a collision accident.

In this embodiment, to discharge the capacitor 16, the high-side power switching element Swp and the low-side power switching element Swn connected in series to each other are both turned on to thereby make a short circuit between both electrodes of the capacitor 16.

Figure 3:
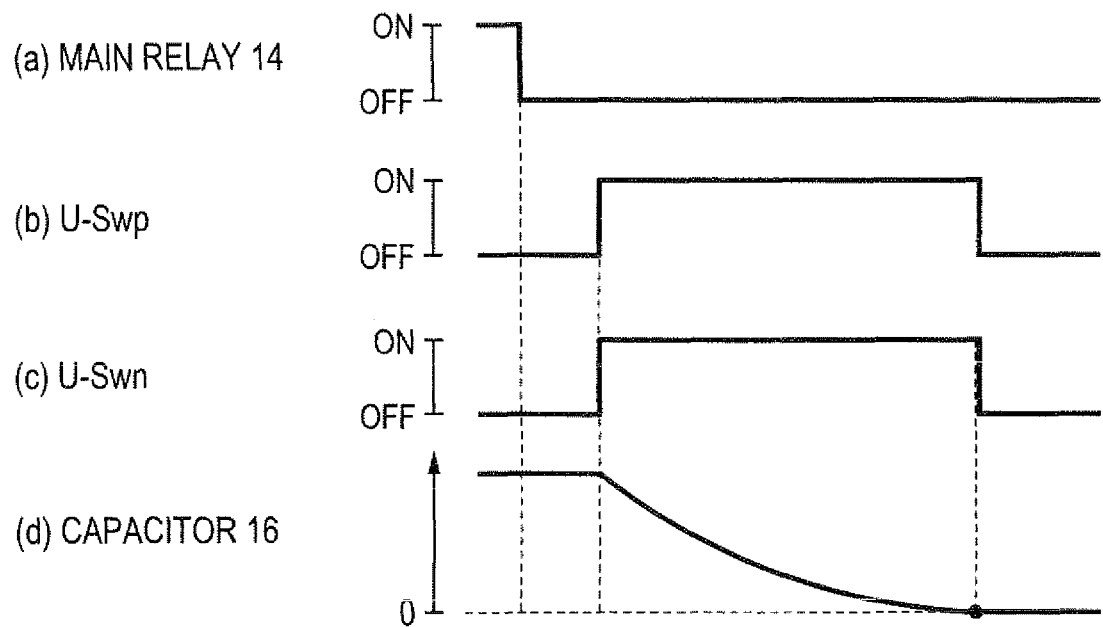
FIG. 3 is a time chart explaining a discharge process performed in the power conversion circuit.

Next, the discharge process of the capacitor 16 is explained with reference to FIG. 3. In FIG. 3, a state transition of the main relay 14 is shown at the section (a), a state transition of the high-side power switching element Swp of the U-phase is shown in the section (b), a state transition of the low-side power switching element Swn of the U-phase is shown in the section (c), and a voltage transition of the capacitor 16 is shown in the section (d).

As shown in FIG. 3, the high-side power switching element Swp and the low-side power switching element Swn are both turned on to discharge the capacitor 16 on condition that the main relay 14 is off. When the charged voltage of the capacitor 16 becomes 0, the high-side power switching element Swp and the low-side power switching element Swn are changed to the off state.

Figure 4A:
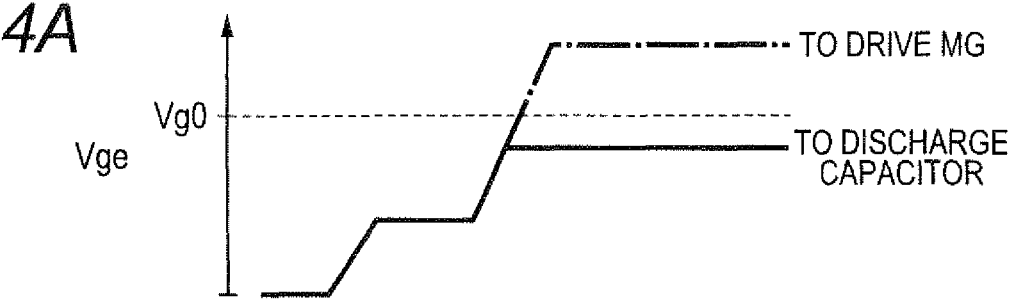
FIGS. 4A and 4B are time charts explaining a gate voltage setting process performed in the power conversion circuit.

The voltage applied to the gate of the power switching element Sw to turn on the power switching element Sw is set lower than the voltage applied to the gate of the power switching element Sw to control the controlled variable of the motor-generator 10 by manipulating the inverter IV. FIG. 4A shows the emitter-gate voltage (gate voltage Vge) of the power switching element Sw when the discharge process is performed and when the motor-generator 10 is driven, respectively. This setting is for preventing a current larger than the threshold current Ith determined by the below explained overcurrent protection function of the drive unit DU from flowing through the power switching element Sw.

Figure 4B:
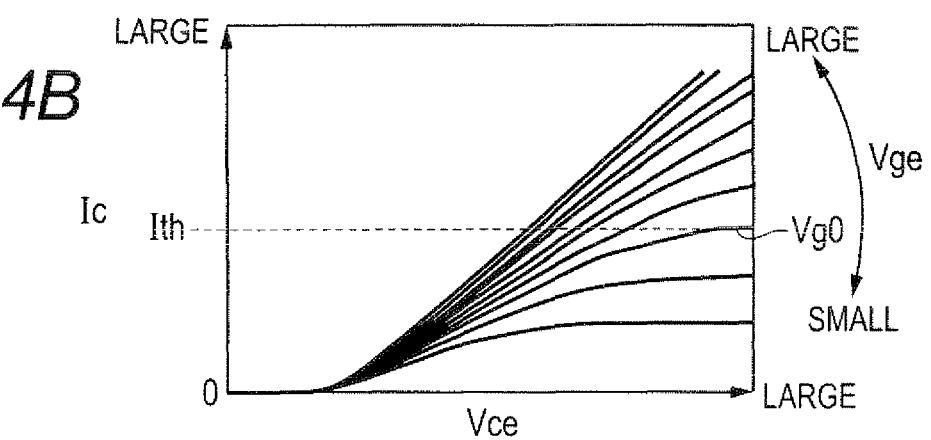

As shown in FIG. 4B, the maximum value of the current flowing between the input and output terminals of the power switching element Sw (the collector current Ic) increases with the increase of the gate voltage Vge. On the other hand, when the collector current Ic is constant, the voltage drop across the input and output terminals (Vce) increases with the increase of the gate voltage Vge. Accordingly, the conduction loss when a current flows through the power switching element Sw increases with the decrease of the gate voltage Vge. Accordingly, in this embodiment, the voltage applied to the gate is set such that the saturation current is larger than the threshold current Ith as a maximum current allowed to flow through the power switching element Sw, and the drive unit DU is provided in compensation. The maximum allowable current mentioned above does not necessarily have to be the rated current of the power switching element Sw. It may be an upper limit current required of the control system.

Incidentally, since the high-side power switching element Swp and the low-side power switching element Swn are both turned on when the discharge process is performed, the current flowing through these power switching elements Sw may become excessively large during the discharge process. Accordingly, the power switching elements Sw may be forcibly disabled by the overcurrent protection function of the drive unit DU if the voltage applied to the gate to perform the discharge process is the same as the voltage applied to the gate to manipulate the inverter IV. In this case, although it is possible to resume the discharge process by turning on the power switching elements Sw again after the current flowing through the power switching elements Sw decreases sufficiently, it is not possible to arbitrarily control the period during which the power switching elements Sw are turned on to short-circuit both electrodes of the capacitor 16. Further, if the voltage applied to the gate is set to a sufficiently large value to improve the effect of reducing the conduction loss, since the rush current flowing at the start of the discharge process becomes excessively large, it may occur that an excessively large current flows through the power switching elements Sw until the power switching elements Sw are turned off by the overcurrent protection function, causing the reliability of the power switching elements to be lowered. Accordingly, in this embodiment, the voltage applied to the gate of at least one of the switching elements Sw at the time of performing the discharge process is set lower than the voltage Vg0 at which the saturation current reaches the threshold current Ith.

Figure 5:
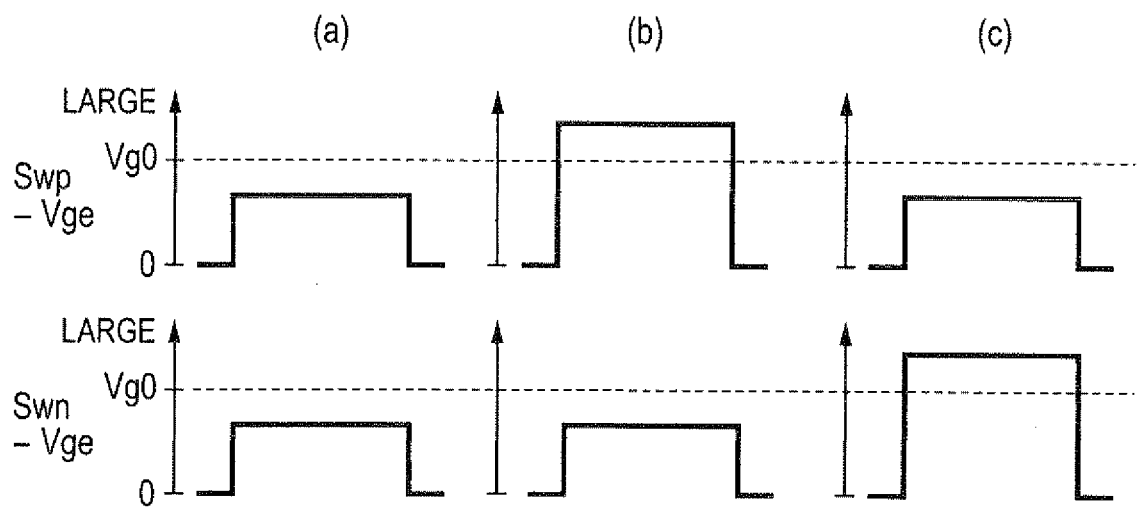
FIG. 5 is a diagram explaining a gate voltage applying method performed in the power conversion circuit.

FIG. 5 shows examples of the voltages respectively applied to the gates of the high-side switching element Swp and the low-side switching element Swn when the discharge process is performed. In FIG. 5, the section (a) shows an example in which the voltage applied to the gate of the high-side switching element Swp and the voltage applied to the gate of the low-side switching element Swn are both lower than the voltage Vg0. The section (b) shows an example in which the voltage applied to the gate of the high-side switching element Swp is higher than the voltage Vg0, and the voltage applied to the gate of the low-side switching element Swn is lower than the voltage Vg0. The section (c) shows an example in which the voltage applied to the gate of the high-side switching element Swp is lower than the voltage Vg0, and the voltage applied to the gate of the low-side switching element Swn is higher than the voltage Vg0.

The first embodiment described above provides the following advantages.

(1) To perform the discharge process, the high-side power switching element Swp and the low-side power switching element Swn are turned on at the same time to thereby make a short circuit between both electrodes of the capacitor 16. This makes it possible to properly discharge the capacitor 16 until the charged voltage of the capacitor 16 becomes 0.

(2) At least one of the voltage applied to the conduction control terminal (gate) of the high-side power switching element Swp and the voltage applied to the conduction control terminal of the low-side power switching element Swn is set lower than the voltage below which the saturation current is smaller than the threshold current Ith. This makes it possible to prevent the overcurrent protection function from activating during the discharge process.

(3) The discharge process is terminated based on the voltage of the capacitor 16. This makes it possible to accurately determine the time to terminate the discharge process.

(4) The discharge process is performed on condition that the main relay 14 is off. This makes it possible to prevent the charge accumulated in the high voltage battery 12 from being discharged through the high-side power switching element Swp and the low-side power switching element Swn.

Second Embodiment

Next, a second embodiment of the invention is described with particular emphasis on the difference with the first embodiment.

Figure 6:
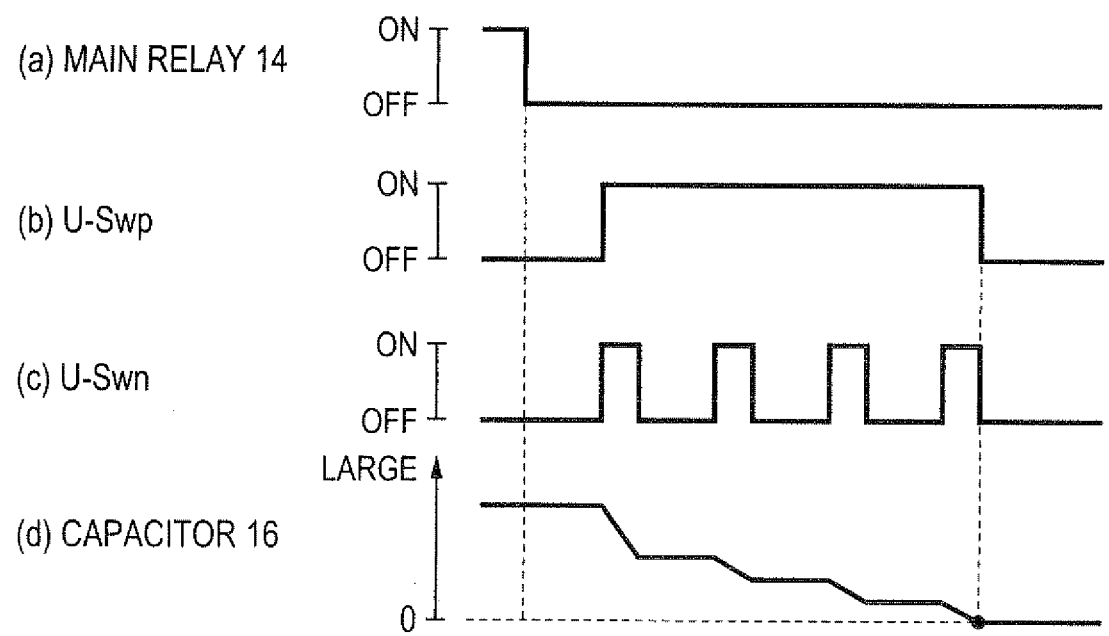
FIG. 6 is a time chart explaining a discharge process performed in a power conversion circuit including a power conversion control apparatus according to a second embodiment of the invention.

FIG. 6 is a time chart explaining the discharge process performed in this embodiment. The sections (a) to (d) of FIG. 6 respectively correspond to the sections (a) to (d) of FIG. 3.

As shown in FIG. 6, in this embodiment, the low-side power switching element Swn of the U-phase is turned on and off multiple times while the power switching element Swp of the U-phase is kept on during the period of the discharge process. Accordingly, a period in which both the high-side power switching element Swp and the low-side power switching element Swn are on occurs multiple times during one period of the discharge process. This makes it possible to prevent the high-side power switching element Swp and the low-side power switching element Swn from being overheated during the discharge process, because no current flows through the high-side power switching element Swp and through the low-side power switching element Swn during periods other than the periods in which they are both on. Accordingly, according to this embodiment, it is possible to suppress the temperature increase of the power switching elements Sw.

The duration of the periods in which the high-side power switching element Swp and the low-side power switching element Swn are both on is set to a predetermined time determined in view of preventing excessive increase of the temperature of the power switching element Sw.

According to the second embodiment, other than the above advantages (1) to (4) provided by the first embodiment, the following advantage can be obtained.

(5) One of the high-side power switching element Swp and the low-side power switching element Swn is turned on and off multiple times while the other is kept on, so that a period in which both electrodes of the capacitor 16 are short-circuited to each other occurs multiple times during one discharge process. This makes it possible to prevent the temperature of the power switching element Sw from increasing excessively.

Third Embodiment

Next, a third embodiment of the invention is described with particular emphasis on the difference with the second embodiment.

Figure 7:
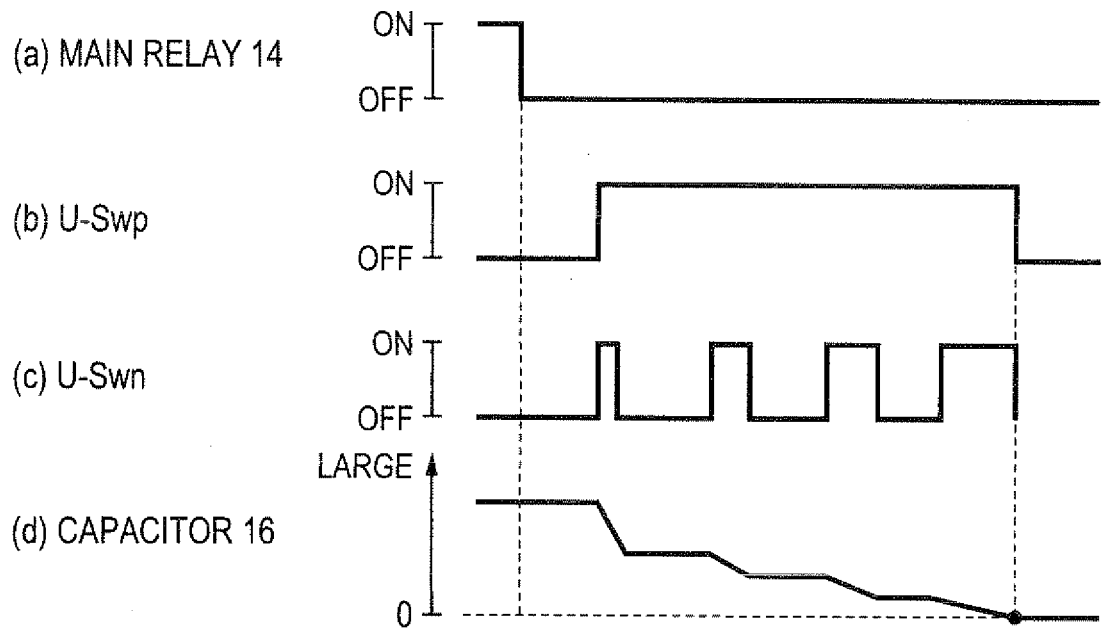
FIG. 7 is a time chart explaining a discharge process performed in a power conversion circuit including a power conversion control apparatus according to a third embodiment of the invention.

FIG. 7 is a time chart explaining the discharge process performed in this embodiment. The sections (a) to (d) of FIG. 7 respectively correspond to the sections (a) to (d) of FIG. 3.

In this embodiment, the on time of the low-side power switching element Swn (the period of time during which the low-side power switching element Swn is on) is increased as the voltage of the capacitor 16 decreases. This is in view of the fact that the heat emitted from the power switching element Sw depends on the discharge energy of the capacitor 16, and the discharge energy is proportional to the product of the voltage and the current of the capacitor 16. The discharge energy decreases as the voltage of the capacitor 16 decreases. Hence, since the heat emitted from the power switching element Sw decreases as the voltage of the capacitor 16 decreases, the temperature of the power switching element Sw can be prevented from increasing excessively even when the power switching element Sw is kept on for a long period of time when the voltage of the capacitor 16 is relatively low.

According to the third embodiment described above, other than the above advantages (1) to (4) provided by the first embodiment, and the advantage (5) provided by the second embodiment, the following advantage can be obtained.

(6) The duration of the period in which both electrodes of the capacitor 16 are short-circuited to each other is variably set depending on the voltage between both electrodes of the capacitor 16. Since the heat emitted from the power switching element Sw depends on the voltage of the capacitor 16, this makes it possible to perform the discharge process while preventing the heat emitted from the power switching element Sw from being excessive.

Fourth Embodiment

Next, a fourth embodiment of the invention is described with particular emphasis on the difference with the first embodiment.

Figure 8:
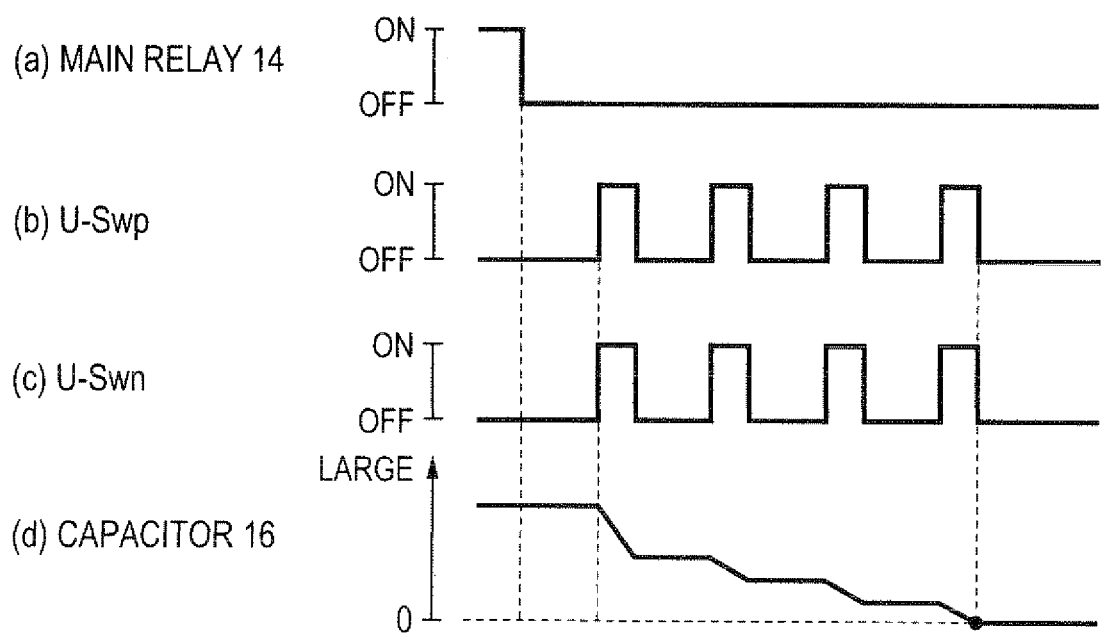
FIG. 8 is a time chart explaining a discharge process performed in a power conversion circuit including a power conversion control apparatus according to a fourth embodiment of the invention.

FIG. 8 is a time chart explaining the discharge process performed in this embodiment. The sections (a) to (d) of FIG. 8 respectively correspond to the sections (a) to (d) of FIG. 3.

In this embodiment, both of the high-side power switching element Swp and the low-side power switching element Swn of the U-phase are turned on and off coincidentally multiple times during the period of the discharge process, so that a period in which both electrodes of the capacitor 16 are short-circuited to each other occurs multiple times during one discharge process. This makes it possible that the heat emitted from the high-side power switching element Swp and the heat emitted from the low-side power switching element are balanced with each other.

Fifth Embodiment

Next, a fifth embodiment of the invention is described with particular emphasis on the difference with the first embodiment.

Figure 9:
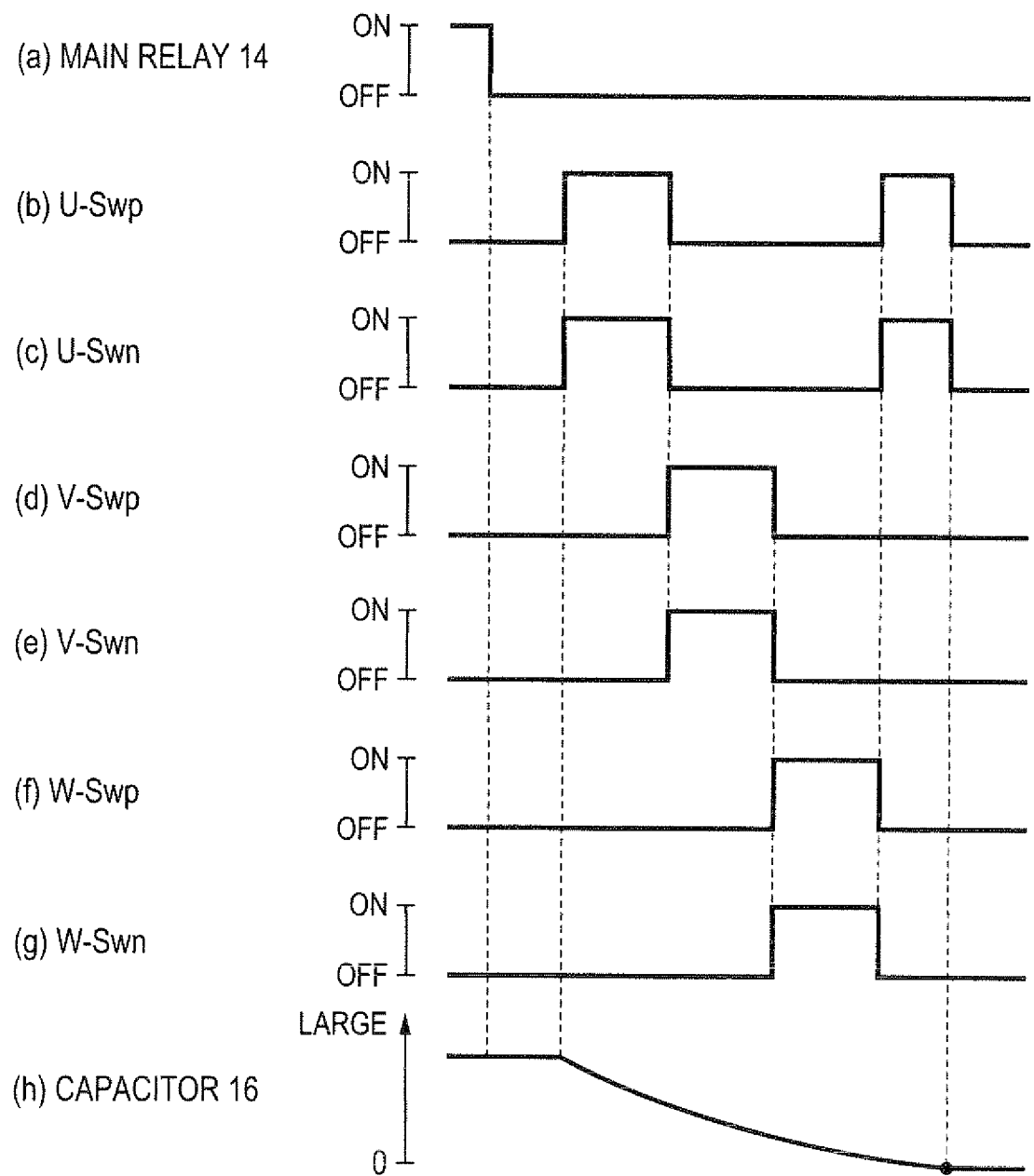
FIG. 9 is a time chart explaining a discharge process performed in a power conversion circuit including a power conversion control apparatus according to a fifth embodiment of the invention.

FIG. 9 is a time chart explaining the discharge process performed in this embodiment. The sections (a) to (c) and (h) of FIG. 9 respectively correspond to the sections (a) to (c) and (d) of FIG. 3. In FIG. 9, the section (d) shows a state transition of the high-side power switching element Swp of the V-phase, the section (e) shows a state transition of the low-side power switching element Swn of the V-phase, the section (f) shows a state transition of the high-side power switching element Swp of the W-phase, and the section (g) shows a voltage transition of the low-side power switching element Swn of the W-phase.

As shown in FIG. 9, in this embodiment, the phase in which both the high-side switching element Swp and the low-side power switching element Swn connected in series are turned on at the same time is switched to another phase during the discharge process. More specifically, in this embodiment, the above changing is performed at predetermined time intervals, so that the power switching elements of all of the U-phase, V-phase and W-phase are used for the discharge process.

According to the fifth embodiment, other than the above advantages (1) to (4) provided by the first embodiment, the following advantage can be obtained.

(7) The phase used to make a short-circuit between both electrodes of the capacitor 16 is changed to another phase during the discharge process. This makes it possible to prevent the temperature of the power switching element Sw of a specific one of the respective phases from increasing excessively.

Sixth Embodiment

Next, a sixth embodiment of the invention is described with particular emphasis on the difference with the second embodiment.

Figure 10:
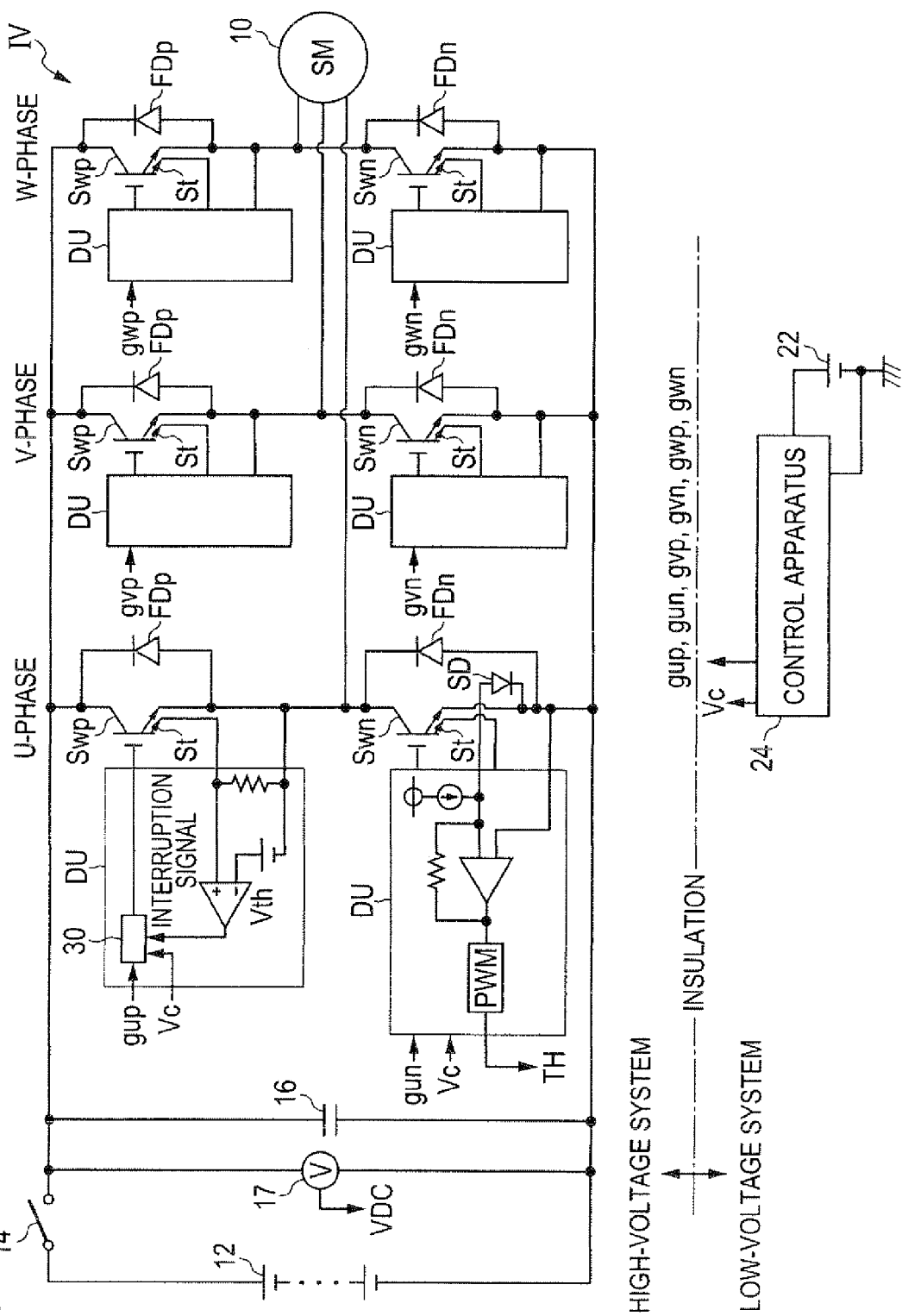
FIG. 10 is a diagram showing the structure of a power conversion circuit including a power conversion control apparatus according to a sixth embodiment of the invention.

FIG. 10 is a diagram showing the structure of a power conversion circuit including a power conversion control apparatus according to the sixth embodiment of the invention. In FIG. 10, the same reference numerals or characters identical to those shown in FIG. 1 represent the same components.

In this embodiment, the temperature TH of the low-side power switching element Swn of the U-phase measured by a temperature-sensitive diode SD is outputted to the control apparatus 24. The power switching element Sw other than this low-side power switching element Swn may be provided with a temperature-sensitive diode, so that its temperature can be detected in the drive unit DU.

Figure 11:
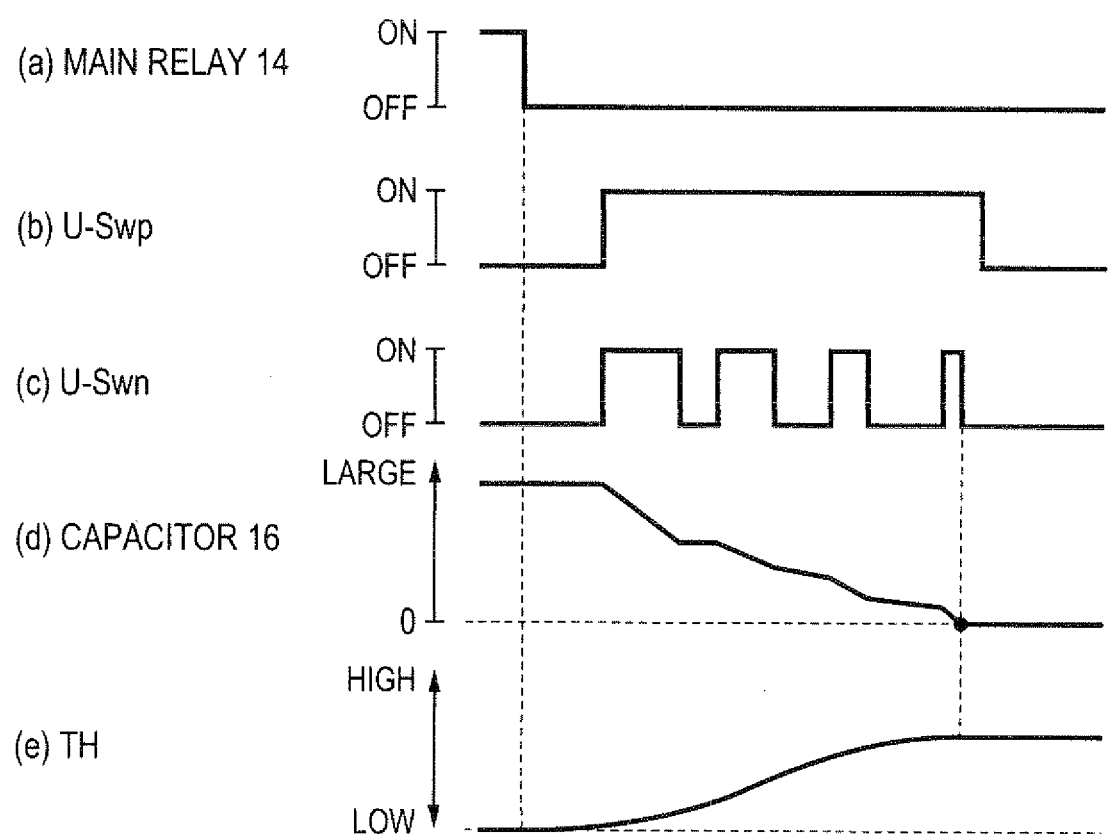
FIG. 11 is a time chart explaining a discharge process performed in the power conversion circuit of the sixth embodiment.

FIG. 11 is a time chart explaining the discharge process performed in this embodiment. The sections (a) to (d) of FIG. 11 respectively correspond to the sections (a) to (d) of FIG. 3. The section (e) of FIG. 11 shows transition of the temperature TH of the low-side power switching element Swn of the U-phase.

As shown in FIG. 11, in this embodiment, the on time of the low-side power switching element Swn is decreased as the measured temperature TH increases during the discharge process. This makes it possible to decrease the heat emitted per unit time from the power switching element Sw, to thereby prevent the temperature of the power switching element Sw from increasing excessively.

According to the sixth embodiment, other than the above advantages (1) to (4) provided by the first embodiment, the following advantage can be obtained.

(8) The duration of the period in which both electrodes of the capacitor 16 are short-circuited to each other is variably set depending on the measured temperature of the power switching element Sw. This makes it possible to prevent the temperature of the power switching element Sw from increasing excessively.

Seventh Embodiment

Next, a seventh embodiment of the invention is described with particular emphasis on the difference with the second embodiment.

Figure 12:
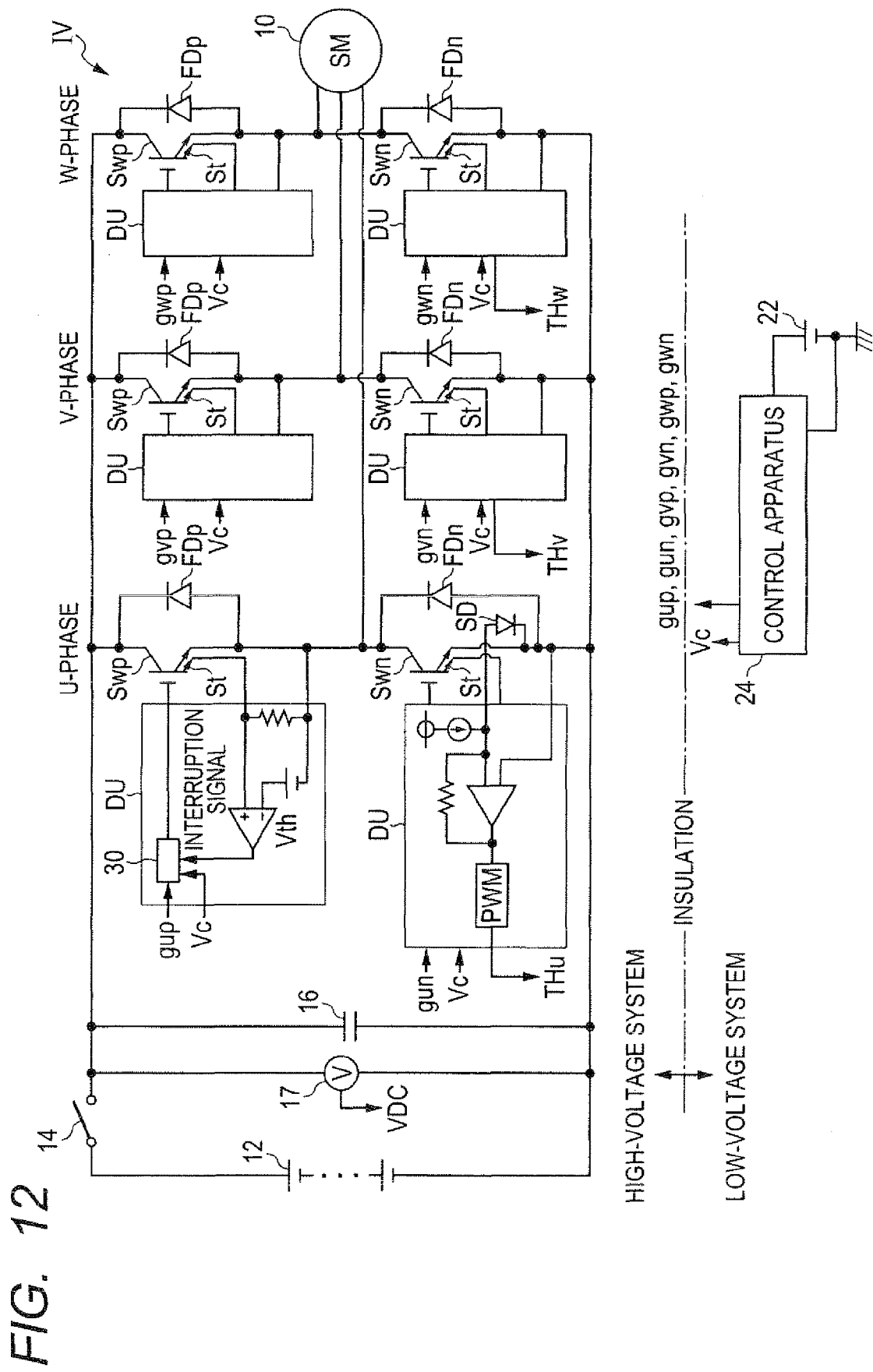
FIG. 12 is a diagram showing the structure of a power conversion circuit including a power conversion control apparatus according to a seventh embodiment of the invention.

FIG. 12 is a diagram showing the structure of a power conversion circuit including a power conversion control apparatus according to the seventh embodiment of the invention. In FIG. 12, the same reference numerals or characters identical to those shown in FIG. 1 represent the same components.

In this embodiment, the temperatures THu, THv and THw of the low-side power switching elements Swn of the U-phase, V-phase and W-phase are measured and outputted to the control apparatus 24. The phase used to make a short circuit between both electrodes of the capacitor 16 is selected on the basis of the temperatures THu, THv and THw.

Figure 13:
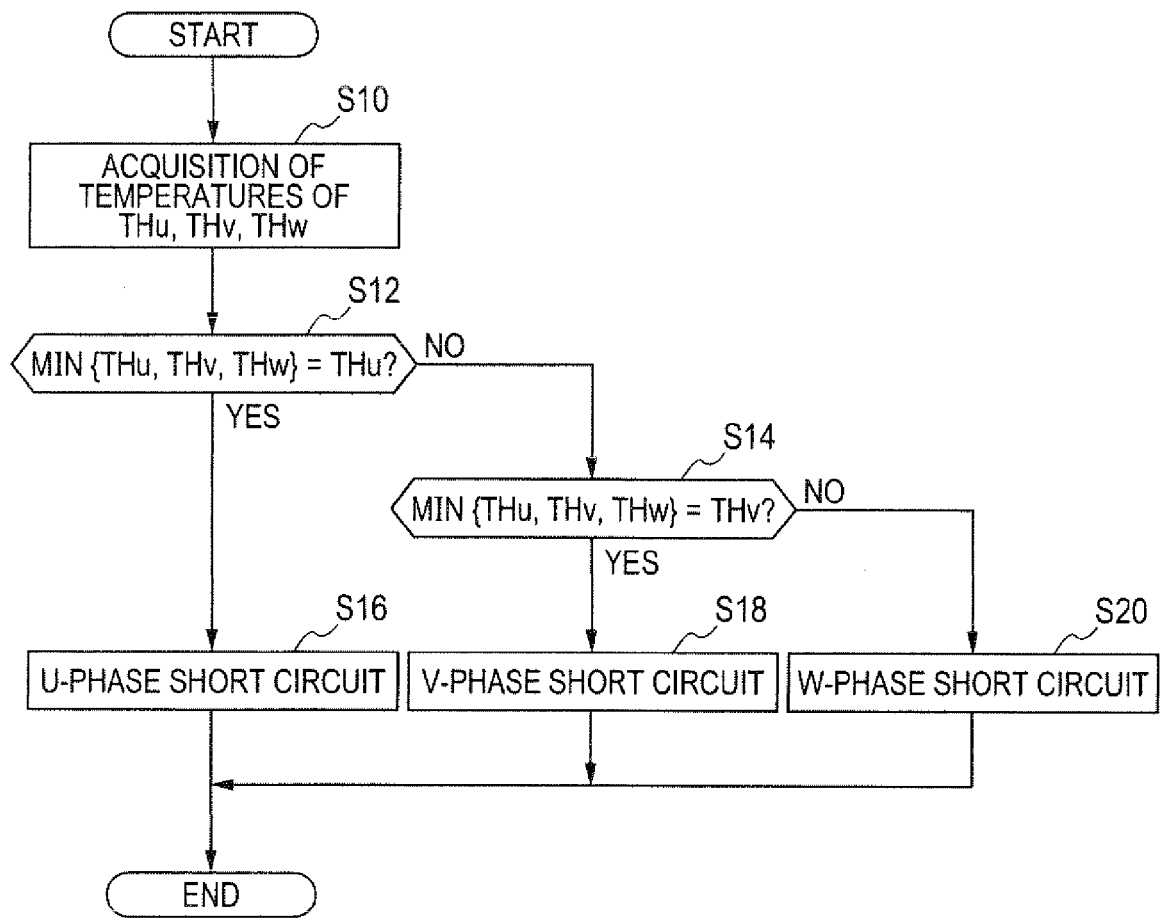
FIG. 13 is a flowchart showing a process for selecting from among phases of an inverter to be subject to a short-circuit process performed in the power conversion circuit of the seventh embodiment.

FIG. 13 is a flowchart showing the process of the above selection. The process is triggered when the main relay 14 is turned off by the control apparatus 24.

This process begins by acquiring the temperatures THu, THv and THw of the power switching elements Sw of the respective phases in step S10. If the temperature THu is the lowest (YES in step S12), both electrodes of the capacitor 16 are short-circuited to each other using the U-phase (step S16). If the temperature THv is the lowest (YES in step S14), both electrodes of the capacitor 16 are short-circuited to each other using the V-phase (step S18). If the temperature THw is the lowest (No in step S14), both electrodes of the capacitor 16 are short-circuited to each other using the W-phase (step S20).

The above selection process may be performed repeatedly during the discharge process. In this case, the phase used to discharge the capacitor 16 is changed among the U-phase, V-phase and W-phase depending on the temperatures of the power switching elements Sw of the respective phases.

According to the seventh embodiment, other than the above advantages (1) to (4) provided by the first embodiment, the following advantage can be obtained.

(9) The capacitor 16 is discharged using the phase whose power switching element Sw is the lowest in temperature. According to this embodiment, it is possible to use the phase whose power switching element Sw is the hardest to increase in temperature during the discharge process.

Eighth Embodiment

Next, an eighth embodiment of the invention is described with particular emphasis on the difference with the first embodiment.

Figure 14:
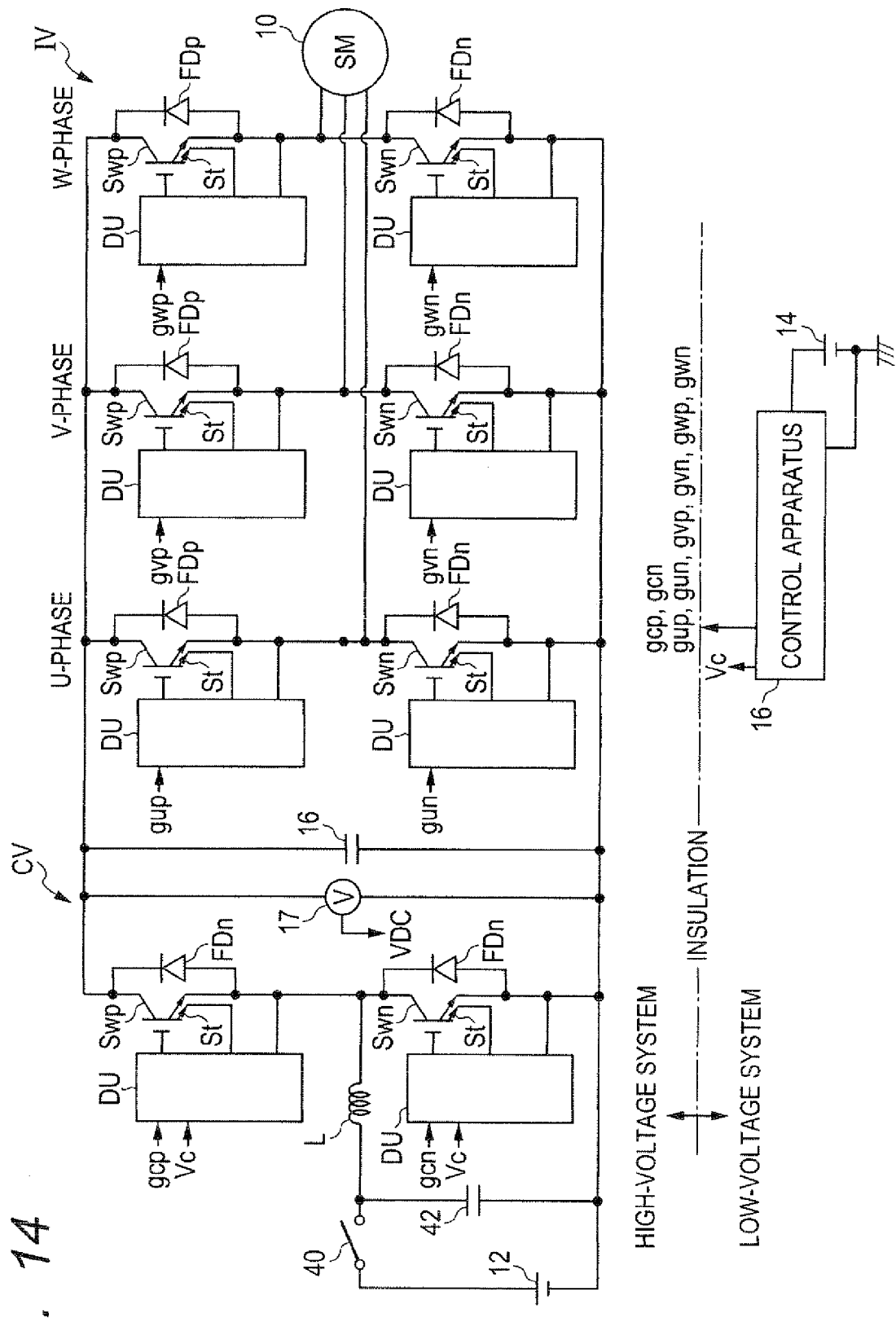
FIG. 14 is a diagram showing the structure of a power conversion circuit including a power conversion control apparatus according to an eighth embodiment of the invention.

FIG. 14 is a diagram showing the structure of a power conversion circuit including a power conversion control apparatus according to the eighth embodiment of the invention. In FIG. 14, the same reference numerals or characters identical to those shown in FIG. 1 represent the same components.

As shown in FIG. 14, in this embodiment, the inverter IV is connected to the high voltage battery 12 through a converter 13 and a main relay 40. The converter CV includes the capacitor 16, a series connection of the high-side power switching element Swp and the low-side power switching element Swn, and a reactor L through which the connection node between the high-side power switching element Swp and the low-side power switching element Swn is connected to the high voltage battery 12. The converter CV is connected with a capacitor 42 at its input terminals.

Figure 15:
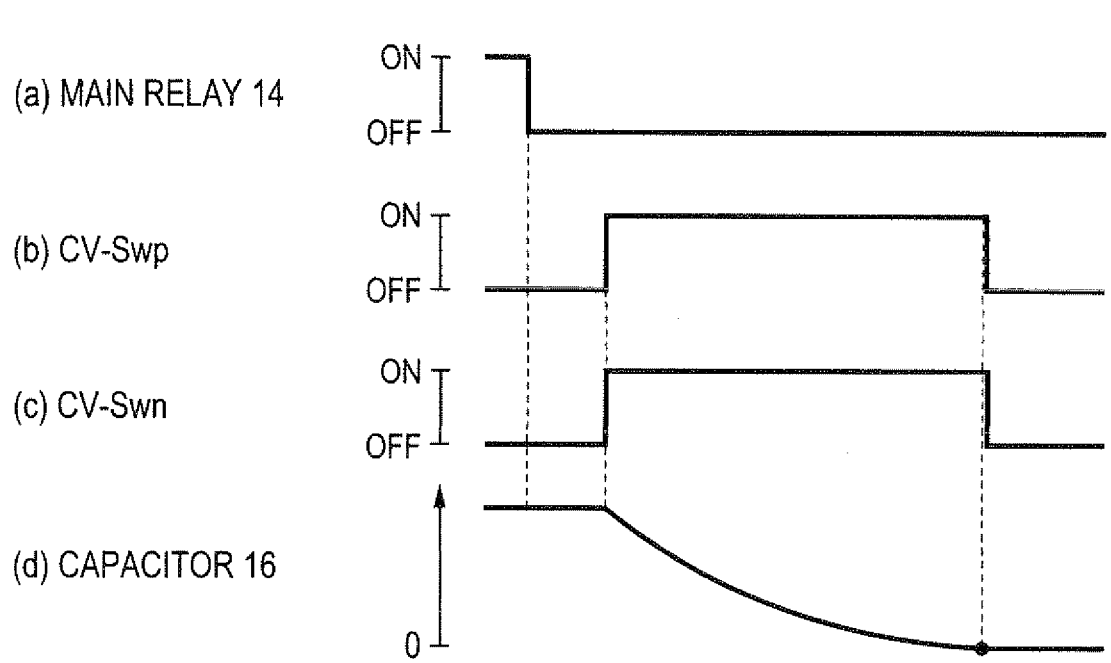
FIG. 15 is a time chart explaining a discharge process performed in the power conversion circuit of the eighth embodiment of the invention.

FIG. 15 is a diagram explaining the discharge process performed in this embodiment.

The sections (a) to (d) of FIG. 15 respectively correspond to the sections (a) to (d) of FIG. 3.

As shown in FIG. 15, in this embodiment, the high-side power switching element Swp and the low-side power switching element Swn of the converter CV are turned on condition that the main relay 40 is off in order to short-circuit both electrodes of the capacitor 16 to thereby discharge the capacitor 16. At this time, the charge accumulated in the capacitor 42 is also discharged through the low-side power switching element Swn.

According to the eighth embodiment described above, other than the above advantages (1) to (3) provided by the first embodiment, the following advantage can be obtained.

(10) The discharge process of the capacitor 16 is performed on condition that the main relay 40 is off. This makes it possible to prevent the high voltage battery 12 from being discharged through the high-side power switching element Swp and the low-side power switching element Swn.

It is a matter of course that various modifications can be made to the above embodiments as described below.

In the above embodiments, the process of short-circuiting both electrodes of the capacitor 16 is performed by use of the lower atm (low-side switching elements), or both of the lower and upper arms. However, it may be performed by use of the upper arm. In this case, the on time may be variably set as described in the third and sixth embodiments.

Further, the on time may be variably set depending on the time elapsed from the start of the discharge process. In this case, since the voltage of the capacitor 16 decreases with the time elapsed from the start of the discharge process, the on time may be set longer as the elapsed time increases. However, since the temperature of the power switching element increases as the elapsed time increases, the on time may be set shorter as the elapsed time increases in view of suppressing the temperature increase. In the above embodiments, one of the series connections of the high-side and low-side switching elements Swp and Swn is used to make a short circuit between both electrodes of the capacitor 16. However, the short circuit may be made using all the power switching elements of all the phases. Further, the power switching elements of the converter CV may be used together with them. In a structure where the high voltage battery 12 is connected with a plurality of inverters, at least one of the series connections of each of inverters may be used at the same time to make the short circuit. In a structure where each of the respective phases of an inverter is constituted including a plurality of series connections of the high-side and low-side switching elements Swp and Swn, all of or some of these series connections may be used at the same time to make the short circuit.

When two or more series connections are used at the same time to make the short circuit, or used in sequence as is the case with the fifth embodiment, the short-circuit state may be generated multiple times by repeatedly turning on and off the power switching elements during the discharge process. FIG. 16 is a time chart explaining an example of using all the series connections of all the phases at the same time to make the short circuit in the second embodiment.

In the case where the converter CV is provided, the short circuit may be made using the high-side and low-side power switching elements Swp and Swn of the inverter IV excluding those of the converter CV.

The method to change the power switching element Sw used to make the short circuit during the discharge process is not limited to the ones described in the fifth and seventh embodiments. For example, the changing may be performed when the temperature of the power switching element Sw being in use to make the short circuit increases above a predetermined temperature. Further, the changing may be performed depending on the decrease of the voltage of the capacitor 16.

In the above embodiments, the control apparatus 24 acquires the temperature of the low-side power switching element Swn, however, the control apparatus 24 may acquire the temperature of the high-side power switching element Swp.

In the structure where the high voltage battery 12 is connected with a plurality of inverters, the control apparatus 24 may acquire the temperature of the power switching element of one of the respective phases for each of or one of the inverters.

Although the target value of the charged voltage of the capacitor 16 in the discharge process is set to 0 in the above embodiments, it is not limited to 0. However, the target value of the charged voltage in the discharge process should be lower than a value below which electric shock can be prevented when performing maintenance work, for example.

The power switching element Sw is not limited to an IGBT. For example, it may be a power MOSFET.

The power conversion circuit is not limited to an inverter or a step-up converter. For example, it may be a step-down converter which steps down the voltage of the high voltage battery 12, and supplies the stepped down voltage to the low voltage battery 22.

The above embodiments show examples in which the present invention is applied to a hybrid vehicle. However, the present invention is also applicable to an electric vehicle. Further, the present invention is not limited to use for controlling a vehicle driving apparatus.

The above explained preferred embodiments are exemplary of the invention of the present application which is described solely by the claims appended below. It should be understood that modifications of the preferred embodiments may be made as would occur to one of skill in the art.

What is claimed is:

1. A control apparatus for a power conversion circuit in which a power storage means is parallel-connected with a series connection of a high-side switching element and a low-side switching element, including a discharge control means for controlling a charged voltage of the power storage means below a specified voltage, each of the switching elements being a voltage-controlled type switching element, a conduction control terminal of each of the switching elements being connected with an over current protection circuit that turns off the switching element when a current flowing between an input terminal and an output terminal of the switching element exceeds a threshold current, the discharge control means being configured to perform a process to produce a short-circuit state of both electrodes of the power storage means a plurality of times by turning both the high-side switching element and the low-side switching element to on state by repeating on-state and off-state for one of the high-side switching element and the low-side switching element a plurality of times during a period in which the charged voltage is controlled below the specified voltage while keeping the other of the high-side switching element and the low-side switching element at on state, and to set a voltage applied to the conduction control terminal of at least one of the high-side switching element and the low-side switching element to a value at which a saturation current becomes smaller than the threshold current at the time of performing the short-circuit state producing process.

2. The control apparatus for a power conversion circuit according to claim 1, wherein the one is the high-side switching element.

3. The control apparatus for a power conversion circuit according to claim 2, wherein the discharge control means sets only the voltage to be applied to the conduction control terminal of the high-side switching element to the value at which the saturation current becomes smaller than the threshold current.

4. The control apparatus for a power conversion circuit according to claim 2, wherein the discharge control means sets the voltage to be applied to the conduction control terminal of the high-side switching element smaller than the voltage to be applied to the conduction control terminal of the low-side switching element.

5. The control apparatus for a power conversion circuit according to claim 1, wherein the one is the low-side switching element.

6. The control apparatus for a power conversion circuit according to claim 5, wherein the discharge control means sets only the voltage to be applied to the conduction control terminal of the low-side switching element to the value at which the saturation current becomes smaller than the threshold current.

7. The control apparatus for a power conversion circuit according to claim 5, wherein the discharge control means sets the voltage to be applied to the conduction control terminal of the low-side switching element smaller than the voltage to be applied to the conduction control terminal of the high-side switching element.

8. A control apparatus for a power conversion circuit in which a power storage means is parallel-connected with a series connection of a high-side switching element and a low-side switching element, including a discharge control means for controlling a charged voltage of the power storage means below a specified voltage,
    each of the switching elements being a voltage-controlled type switching element,
    a conduction control terminal of each of the switching elements being connected with an over current protection circuit that turns off the switching element when a current flowing between an input terminal and an output terminal of the switching element exceeds a threshold current,
    the discharge control means being configured to perform a process to produce a short-circuit state of both electrodes of the power storage means a plurality of times by turning both the high-side switching element and the low-side switching element to on state by repeating on-state and off-state for both of the high-side switching element and the low-side switching element in a state of the conduction control terminals of the high-side switching element and low-side switching element being applied with the voltage a plurality of times during a period in which the charged voltage is controlled below the specified voltage, and to set a voltage applied to the conduction control terminal of at least one of the high-side switching element and the low-side switching element to a value at which a saturation current becomes smaller than the threshold current at the time of performing the short-circuit state producing process.

9. The control apparatus for a power conversion circuit according to claim 1, wherein the discharge control means sets a duration of the short-circuit state to a predetermined fixed time.

10. The control apparatus for a power conversion circuit according to claim 1, wherein the discharge control means variably sets a duration of each short-circuit state depending on a voltage between both electrodes of the power storage means.

11. The control apparatus for a power conversion circuit according to claim 9, wherein the discharge control means variably sets a duration of each short-circuit state depending on a detected value of a temperature of the switching element.

12. The control apparatus for a power conversion circuit according to claim 1, wherein
    the power storage means is parallel-connected with a battery through a switch means, and
    the discharge control means performs the short-circuit state producing process on condition that the switch means is in open state.

13. The control apparatus for a power conversion circuit according to claim 1, wherein
    the power conversion circuit is provided with a step-up converter connected to a battery at an input terminal thereof, and connected to the power storage means at an output terminal thereof,
    a switch means is connected between the battery and the step-up converter, and
    the discharge control means performs the short-circuit state producing process on condition that the switch means is in open state.

14. The control apparatus for a power conversion circuit according to claim 1, wherein
    the power conversion circuit includes the series connection of the high-side and low-side switching elements in a plural number, and
    the discharge control means is configured to produce the short-circuit state for all of the series connections at the same time during a period to perform the short-circuit state producing process.

15. The control apparatus for a power conversion circuit according to claim 1, wherein
    the power conversion circuit includes the series connection of the high-side and low-side switching elements in a plural number, and
    the discharge control section is configured to change the series connection that should perform the short circuit-state producing process during a period to perform the short-circuit state producing process.

16. The control apparatus for a power conversion circuit according to claim 6, wherein the discharge control means performs the process to change the series connection based on a detected value of a temperature of the switching element.

17. The control apparatus for a power conversion circuit according to claim 1, wherein
    the power conversion circuit includes the series connection of the high-side and low-side switching elements in a plural number,
    the control apparatus is electrically insulated from the power conversion circuit, and has a function of acquiring a detected value of the temperature of the switching element for only a part of the series connections of the power conversion circuit, and
    the discharge control means performs the short-circuit state producing process for only the part of the series connections.

18. The control apparatus for a power conversion circuit according to claim 1, wherein
    the power conversion circuit includes the series connection of the high-side and low-side switching elements in a plural number, and
    the discharge control means set the series connection the temperature of whose switching element is the lowest as the series connection that should perform the short-circuit state producing process.

19. The control apparatus for a power conversion circuit according to claim 1, wherein the discharge control means terminates the short-circuit state producing process based on the voltage of the power storage means.

20. The control apparatus for a power conversion circuit according to claim 1, wherein
the discharge control means is configured to manipulate each of the switching elements through a drive circuit,
the drive circuit has a voltage generating means to generate the voltage to be applied to the conduction control terminal of the switching element, and
the voltage generating means variably changes the voltage to be generated in accordance with manipulation by the discharge control means.

21. The control apparatus for a power conversion circuit according to claim 20, wherein the power conversion circuit constitutes a vehicle high-voltage system electrically insulated from a vehicle low-voltage system, and
the voltage generating means is constituted including a transformer.

22. The control apparatus for a power conversion circuit according to claim 21, wherein
the transformer includes a pair of primary coils magnetically coupled to a secondary coil,
the voltage generating means further includes means for opening and closing a loop circuit of one of the primary coils and a power supply to feedback-control a resistor-divided voltage across the other of the primary coils at a target value, and
the discharge control means is configured to manipulate degree of division by the resistor-division.

23. The control apparatus for a power conversion circuit according to claim 8, wherein the discharge control means sets the voltages to be applied to the conduction control terminals of the high-side switching element and the low-side switching element to the value at which the saturation current becomes smaller than the threshold current.

* * * * *